Oct. 1, 1940.　　　J. W. HARVEY　　　2,216,688
FISH LURE
Filed Oct. 15, 1938
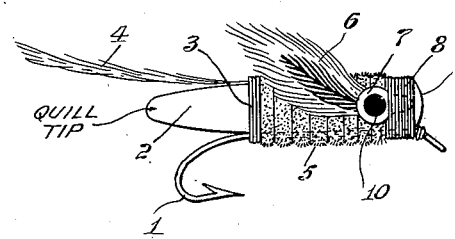
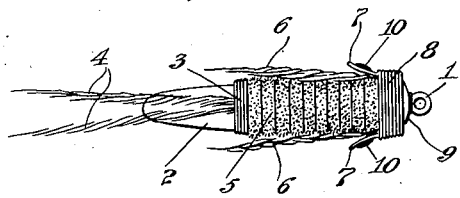
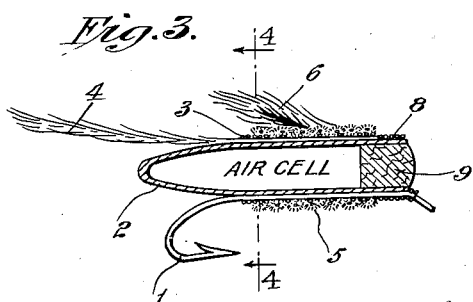
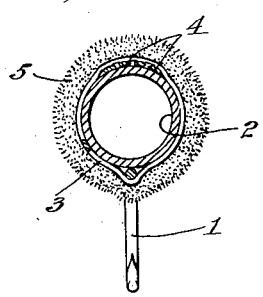
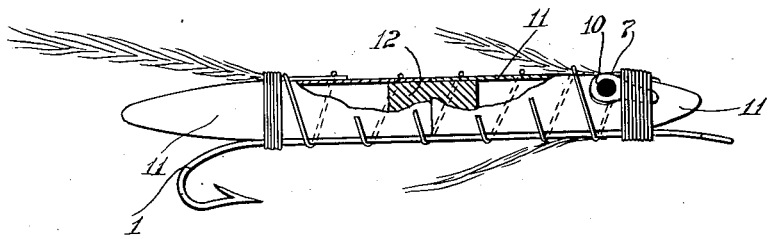
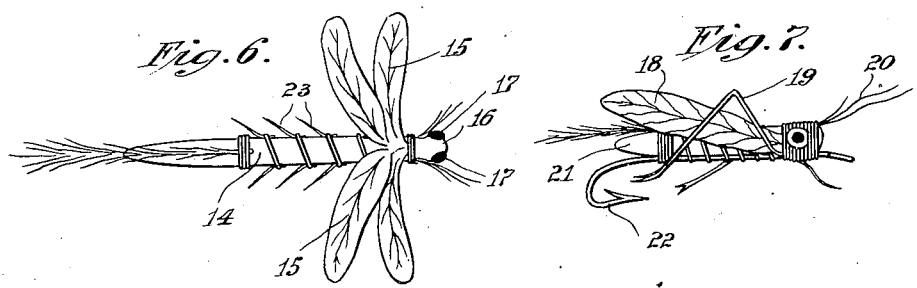
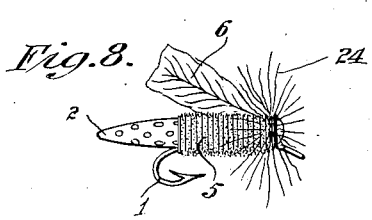
INVENTOR
James W. Harvey
BY
ATTORNEY Patented Oct. 1, 1940

2,216,688

UNITED STATES PATENT OFFICE 2,216,688

FISH LURE

James W. Harvey, Lakeville, Conn., assignor to Robert S. Allyn, New York, N. Y.

Application October 15, 1938, Serial No. 235,148

8 Claims. (Cl. 43—48)

This invention relates to fish lures or artificial bait.

One object is to provide an attractive fish lure that is permanently buoyant.

Another object is to provide a fish lure that is tough and durable.

Still another object is to provide a fish lure that is easy and cheap to construct.

A further object is to provide a lure that has the appearance of a bee or other insect.

An object of this invention is to provide a lure that can be readily cast by either a fly rod or a casting rod.

Another object is to provide a lure that is suitable for trolling.

In my former application Serial Number 158,021, filed August 9, 1937, I have shown a lure which in its preferred form resembles a minnow or other small fish and which preferably employs a transparent or translucent winding of artificial gut. When the body is relatively small and made of wood it does not ordinarily float but may be used for trolling or casting. The gut winding is also quite expensive. My present improvement is intended primarily to provide a floating or so-called "fly" type lure which may be made to resemble various forms of flies, bugs, bees, or other insects and which does not require gut or the like. I have discovered that a quill tip with a sealed end provides an ideal body for such a lure. Attraction is afforded by the body itself and such ornamental or imitative hairs, eyes, feathers, etc., as may be added.

A quill tip, the ends of which are closed, is secured along the top of the shank of the hook by means of thread, silk, or the like, which also fastens the additional elements. Chenille may be employed to ornament a part of the body. Eye imitations are preferably applied to the head end and the irridescent tail end of the quill is preferably left exposed or may be colored or ornamented if desired.

Although feathers and quills have been heretofore proposed for use in fish lures, so far as I know they have never been used as set forth herein to provide floating lures resembling insects of various kinds.

Fig. 1 is a side view of one form of lure of my invention.

Fig. 2 is a top view showing the chenille winding and the flaring eyes.

Fig. 3 is a longitudinal section showing the relation of parts.

Fig. 4 is a cross sectional view of the lure on the plane of line 4—4 of Fig. 3.

Fig. 5 shows another form of my invention, with a double ended body, the center of which is broken away to show how the quill tips are mounted end to end.

Fig. 6 is a plan view showing a lure resembling a "darning needle" or dragon fly.

Fig. 7 is a side view of a lure resembling a grasshopper.

Fig. 8 is a side view of a so-called "dry" fly lure showing a hackle flared radially about the front end, and on an enlarged scale.

A lure of my invention may be made as follows: The barbed end of the hook 1 is put in a vise and the quill tip 2 is placed along the shank of the hook. Thread 3 is then wound about the quill and shank of the hook, and if desired, hairs or tail feathers 4 are introduced beneath the thread and preferably tied in place. One end of a length of chenille 5 is then attached by the thread winding. The thread is then wound about the hook and quill in a few widely spaced turns toward the large end of the quill. The chenille is then wound firmly about the hook and quill and the thread windings toward the large end of the quill, and its further end is secured to the quill and shank by a few turns of thread. The side wing feathers 6 are then attached to the quill by a few turns of the thread. Eye disc or tab members 7 for instance of yellow or red enameled cloth are fastened by a few turns of thread 8 wound around the front edges of the discs so as to bind them to the quill body and hook.

As a result of this method of attachment the eyes flare outwardly and are quite prominent and tend to flap when the lure is drawn along the water. The end of the thread is then wound tightly about the large end of the quill and tied off. Previous to this winding operation, the large end of the quill is plugged with wood or cork 9. I have found it good practice to coat the quill body with shellac or varnish just before winding the chenille so as to insure adherence of the chenille to the body. It is also desirable to coat the end of the quill and plug and the windings 8 with cement or varnish to reinforce the front end of the lure.

The eye members 7 may have additional pupils 10 glued or cemented on the tabs 7 so as to further increase the prominence of these members. A coating of enamel over these members enhances the appearance. It is also desirable to brush a line of cement along the shank of the hook next the quill so as to fasten the parts together more securely.

The air cell within the quill makes the lure permanently buoyant. The lure may employ a hook with an eye or with a conventional eyeless shank.

The front or large end of the body is abrupt, and when being drawn through the water, this front end is responsible for a skipping movement.

A fly made with a quill and prepared as here described will float indefinitely with the hook barb beneath the body no matter how wet it may get, and need not be treated repeatedly with special fly dressings.

In the form shown in Fig. 5, two quill tips, 11, 11 are connected end to end by a single plug 12 glued or cemented in place. This form may be ornamented as desired.

For some insect imitations the chenille body winding may be omitted and the tail members made more prominent. Some imitations require two sets of wings and in place of the disc-like eyes large bulbous eyes are desirable for instance to imitate a dragon fly such as shown in Fig. 6. Here the body 14 is formed of a quill tip secured to the top of the hook shank and provided with wings 15. The head 16 may be a part of the plug that closes the large end of the quill and may have eyes 17 on the head. Other strands 23 may be added to simulate legs, etc., if desired.

In Fig. 7 the lure resembles a grasshopper with wings 18, legs 19 and feelers 20 all secured to the quill 21 and the hook shank 22 by silk or other thread wound about the quill and shank.

In Fig. 8 is shown a "dry fly" type lure with a balancing wing member 6 secured to the quill tip 2 and the hook 1 by thread windings. Chenille 5 is also supplied about the quill tip and hook shank. These parts may be assembled and secured together in the same manner as the parts of the form of Figs. 1 to 4 but the eyes are omitted. Hackle 24 is wound radially about the front of the lure as in other dry fly type lures.

By the method herein set forth, very attractive, useful and durable lures may be made quite cheaply. By varying the size, color and shape of feathers or hackles and by the use of selected chenille, tinsel and other body wrappings and by varying the color, shape and size of eyes or heat attachments a wide variety of designs may be produced having many of the advantages of my invention.

Quill tips are quite inexpensive, waterproof, light in weight but tough and not easily damaged. They can be obtained in various sizes suitable for different types of lures. The small end is of course usually closed but should be sealed if necessary. The plug is preferably of cork and should be cemented in the large end before winding so as to prevent it from collapsing when winding on the thread.

I claim:

1. A bug-like fish lure comprising a hollow resilient quill tip closed at both ends, a hook having its shank laid along the outside of the quill tip, a wing element at the side of the quill tip, and a winding of material around the quill tip and the shank of the hook and also around the wing element and securing it to the large end of the quill tip and forming the body of the lure and leaving the other end of the quill tip projecting opposite the barb of the hook.

2. A fish lure comprising a resilient quill section closed at both ends and buoyant, a barbed hook having a shank cemented along the outside of the quill section with the barbed portion located at one side of the quill section between its ends, a thread winding about the quill section and the shank of the hook, a balancing wing element secured to the end of the quill section near the eye of the hook, and a chenille wrapping about the quill section and the shank of the hook between the eye of the hook and the barbed portion of the hook.

3. A fish lure comprising a resilient quill section closed at both ends and buoyant, a barbed hook having a shank cemented along the outside of the quill section with the barbed portion located at one side of the quill section between its ends, a thread winding about the quill section and the shank of the hook, a chenille wrapping about the quill section and the shank of the hook between the eye of the hook and the barbed portion of the hook, and a hackle secured to the quill section and the shank of the hook near the eye of the hook.

4. A fish lure comprising a tapered quill tip having its larger end plugged up and secured along the outside of the shank of a hook, the smaller end of the quill tip extending beyond the curved part of the hook, a balancing wing secured to the quill tip and shank near the larger end of the quill tip, and hackle wound around the larger end of the quill tip and the shank of the hook and cemented in place.

5. A floating fish lure comprising a barbed hook having a shank, a hollow resilient quill tip closed at both ends and tapered down at its rear end and cemented to the outside of the shank of the hook with its tapered end extending beyond the hook and opposite its barbed end, the larger end of the quill tip being adjacent the opposite end of the hook, thread windings binding the quill tip to the shank of the hook throughout the length of contact between the quill tip and the shank, and feather elements secured at the head end.

6. A floatable fish lure in imitation of an insect comprising a hollow resilient quill tip closed at both ends, a hook having its shank secured along the outside of the shank, a winding of material around the quill tip and the shank extending from the head end part of the way toward the opposite end to simulate the body of the insect but leaving an end of the quill tip projecting to simulate the rear end of the body, and head simulating elements at the opposite end of the quill tip.

7. A fish lure comprising a hook, a body member secured thereto, discs of enameled cloth on opposite sides of one end of the body member, thread windings securing one edge of each disc to the body member, and transparent enamel covering the thread windings and the visible portions of the discs.

8. A fish lure comprising a barbed hook, a body secured to the shank thereof, eye discs of enameled material secured to the body at one end thereof, a pupil-like colored disc cemented to each eye disc, a coating of transparent enamel applied to each pupil-like disc and the surrounding portions of the supporting eye disc, and feather-like elements secured to the shank and body adjacent the eye discs.

JAMES W. HARVEY.